United States Patent
Dornier et al.

[11] Patent Number: 5,835,955
[45] Date of Patent: Nov. 10, 1998

[54] DISK ARRAY CONTROLLER WITH ENHANCED SYNCHRONOUS WRITE

[75] Inventors: Pascal Dornier, Sunnyvale; Dan Kikinis, Saratoga, both of Calif.

[73] Assignee: Elonex I. P. Holdings, London, United Kingdom

[21] Appl. No.: 918,782

[22] Filed: Aug. 25, 1997

Related U.S. Application Data

[63] Continuation of Ser. No. 494,011, Jun. 23, 1995, abandoned.

[51] Int. Cl.$^6$ ........................................ G06F 12/16
[52] U.S. Cl. ........................................ 711/162; 395/182.04
[58] Field of Search ........................ 395/440, 441, 395/488, 489, 182.03, 182.04, 182.13, 182.18; 711/113, 114, 161, 162

[56] References Cited

U.S. PATENT DOCUMENTS

| | | | |
|---|---|---|---|
| 5,274,799 | 12/1993 | Brant et al. | 395/182.04 |
| 5,297,258 | 3/1994 | Hale et al. | 711/114 |
| 5,313,612 | 5/1994 | Satoh et al. | 711/162 |
| 5,341,493 | 8/1994 | Yanai et al. | 711/161 |
| 5,404,500 | 4/1995 | Legvold et al. | 395/182.04 |
| 5,418,925 | 5/1995 | DeMoss et al. | 711/114 |
| 5,448,719 | 9/1995 | Schultz et al. | 395/182.03 |
| 5,488,731 | 1/1996 | Mendelsohn | 711/114 |
| 5,526,482 | 6/1996 | Stallmo et al. | 395/182.04 |
| 5,535,399 | 7/1996 | Blitz et al. | 395/750 |
| 5,644,696 | 7/1997 | Pearson et al. | 395/182.04 |

*Primary Examiner*—Tod R. Swann
*Assistant Examiner*—Conley B. King, Jr.
*Attorney, Agent, or Firm*—Donald R. Boys

[57] ABSTRACT

A disk array server has a cache and a log drive wherein data blocks, as received are written synchronously to both the cache and the log drive, the cache being written back to the disk array as opportunity affords. The log drive is managed so, when full, data is overwritten in the order first stored on the log drive. Data blocks written to the log drive are flagged as to whether the same block in cache has been written to the disk array, and the flags are updated as the cache is written back to the disk array. In the event of a power failure, data lost from the volatile cache as not yet written to the disk array may be recovered from the log drive. In one embodiment, the recovery is automatic on startup after a power failure.

8 Claims, 4 Drawing Sheets

DISK ARRAY CONTROLLER WITH ENHANCED SYNCHRONOUS WRITE

CROSS REFERENCE TO RELATED APPLICATIONS

This is a continuation application Ser. No. 08/494,011 filed Jun. 23, 1995 now abandoned.

FIELD OF INVENTION

The present invention is in the area of methods and apparatus for safeguarding data in data-storage devices in the event a primary-power failure occurs, and it is particular relevant to a server system containing an array of disk drives.

BACKGROUND OF THE INVENTION

Computer systems running UNIX, NetWare, or one of several other multi-user operating systems may incorporate a data storage server system. Such a server system typically contains an array of disks drives that are managed by a disk-drive control unit. A disk drive control unit in this case typically comprises various electronic components such as a central processing unit (CPU) and a cache memory for temporary storage of transient data.

In a disk array server of the sort described, blocks of data arriving at the server from other stations on a computer network may be written to the disk array in several different ways. For example, in a process called direct write in the art, data is written directly to a disk array without involving a server-resident CPU or cache. The direct-write approach for writing data to a disk drive has an advantage of a high data-transfer rate, but the approach is prone to errors since it does not include any system for error checking. In case of primary-power failure, direct-write allows proper termination of computer and disk-drive activities provided an alternate power source can sustain system power for several seconds.

In an alternative data storage process called cache write in the art, data is temporarily stored in a cache memory before it is randomly written to a disk array. In the event of primary-power failure, an alternate system power source within a server system allows time for proper termination of server activities. However, such system power sources may not provide enough time to transfer all data that resides in a large cache to a disk array. Consequently, cache-resident data that has not been written to a disk array in the time before power is completely gone will be lost. Since after each data transmission a computer turns to other tasks, the computer typically keeps no record of transmitted data, and recovery of the lost data is not possible. On the other hand, a server and computer system that derives its emergency power from an uninterruptable power supply (UPS) is protected for an extended period of time. Nevertheless, if, in the event of primary power failure, users ignore warning signals and continue to operate until the batteries of the UPS are exhausted, data still will be lost.

What is clearly needed is an enhancement to a server system that prevents data loss in case of primary-power failure and that does not diminish the data-handling efficiency of a disk server.

SUMMARY OF THE INVENTION

In a preferred embodiment of the present invention, a disk array server system is provided comprising an interface to a network communication link; a CPU connected to the interface; a cache memory coupled to the CPU; a non-volatile log drive having a capacity equal to or larger than the cache capacity, coupled to the CPU through a log drive controller; and a storage drive array connected to the cache. Data blocks received at the network interface are written synchronously to cache and to the log drive with the log drive controlled so that when all sectors are written, sectors are overwritten in the order they were first written, and so that blocks of data written to the log drive are identified as to whether or not the blocks have been written to the disk array from the cache. Sectors in the log drive are only overwritten once the cache data has been written to a disk in the disk array.

In the event of a power failure, any data not already written from cache to the disk array, and therefore lost from the volatile cache when the power is lost, may be recovered from the log drive. In an alternative preferred embodiment control routines on startup search the log drive for data blocks flags as not having been written to the disk array, and these blocks are written at startup.

The disk array may be, in various embodiments, either composed of hard disk drives or read/write optical drives, such as magneto-optical drives. Flagging of data blocks can be as simple as setting a status bit associated with each block written to the log drive when the block is first written (not yet written to the disk array). As cache write-backs are conducted thereafter, the status bits on the log drive are updated.

DESCRIPTION OF THE PREFERRED EMBODIMENTS

In an embodiment of the present invention a disk array has a cache and a log drive with a storage capacity equal to or greater than the cache. The log drive in this case is a disk drive dedicated to back-up data that is written to the cache, and is an addition to the array. By incorporating a log drive in a server system, cache-resident data that is lost due to power failure can be recovered, since a copy of the cache-resident data will be recorded on the non-volatile log drive. The inventors refer to the backup process as synchronous write because data arriving at the server interface is simultaneously written to the cache and the log drive.

General Description of a Server System

Figure 1:
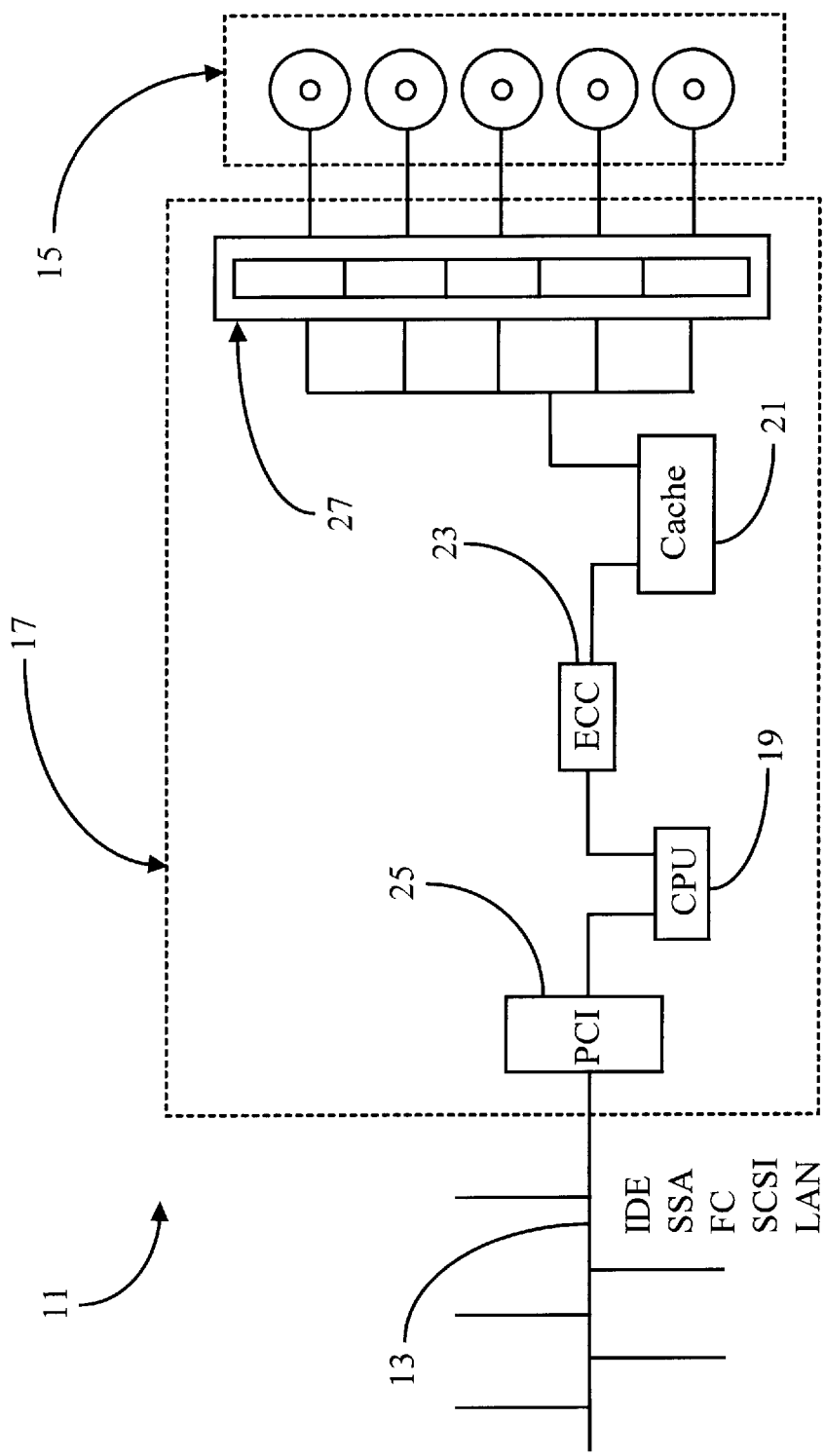
FIG. 1 is a block diagram illustrating a server operating in normal write mode as is well-known in the art.

FIG. 1 is a block diagram illustrating a server system 11 operating in normal write mode as is well-known in the art. Server system 11 is a station on a network connected by communication link 13, which may operate according to any one of several known network protocols, such a SCSI (small computer systems interface), LAN (local area network), or other.

System 11 includes a disk-array controller 17 and an array of data-storage devices 15 such as, but not limited to, disk drives and writable magneto-optical disk drives. Disk-array controller 17 comprises, but is not limited to, a CPU 19, a cache memory 21, an error correction system 23, a network interface 25, and a set of disk-drive interfaces 27. Blocks of data arriving at network interface 25 are stored in cache 21 by action of CPU 19. At a later stage, each of these data blocks are written from cache 21 to a drive on disk array 15, a process commonly referred to as write-back in the art.

It is known to the inventors and in the art, that in the event of a primary-power failure, stored system power or a small on-board battery may provides power long enough to allow a user to properly terminate computer activities and to allow a disk controller to properly terminate disk-drive activities, which includes, but is not limited to, moving read/write heads to a parking area to avoid damage to disk surfaces and completing a partially written disk sector. However, small batteries or stored energy cannot sustain system power for long, and a server system might fail to transfer the entire contents of cache 21 to a disk in the drive array. Consequently, when stored energy or battery power is exhausted, cache-resident data may well be lost.

Description of a Synchronous Write Enhancement

Figure 2:
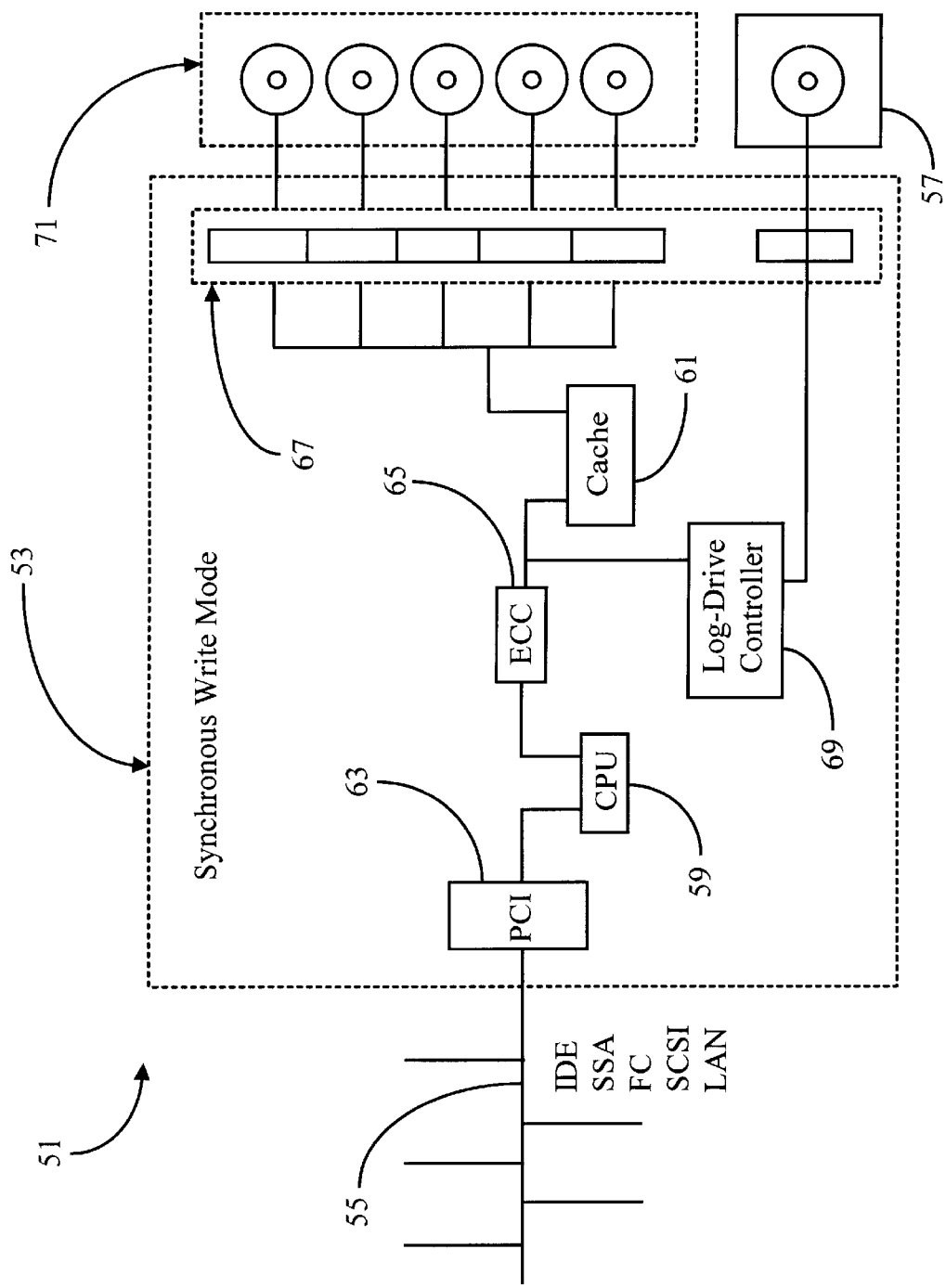
FIG. 2 is a block diagram illustrating a server enhanced with a synchronous write system according to an embodiment of the present invention.

FIG. 2 is a block diagram illustrating a server system 51 enhanced with a synchronous-write system according to an embodiment of the present invention. Server system 51 comprises a communication link 55 according to one or another of known network protocols, such as SCSI or Ethernet, a disk-array control unit 53, a disk array 71 such as, but not limited to an array of hard disk drives or writable CDs, and a log drive 57. Those with skill in the art will recognize that the technology of server systems is old in the art, and that there are many possible variations in the components of a server system.

Disk drive control unit 53 comprises, but is not limited to, a CPU 59, a cache 61, a network interface 63, an error correction system 65, a set of disk-drive interfaces 67, and a log-drive controller 69. In this embodiment of the present invention data blocks arriving at network interface 63 are stored simultaneously in cache 61 and log drive 57. The storage capacity of log drive 57 equals or exceeds that of cache 61, so the log drive can retain a copy of all data that resides in cache 61 at any time.

Log drive 57 in this embodiment of the invention functions as a circular buffer. The read/write head of log drive 57 starts writing data on track 0 and progresses, one track at the time, toward the center of the disk. When the last track is full, the read/write head returns to track 0 and writes over previously written data. This linear mode of writing eliminates time-consuming random movements of the read/write head that are common for most write operations. Also, the data-transfer rate for the log drive can be much higher than that for a disk drive in disk array 71.

Description of a Status Marker

At intervals determined by log-drive controller 69, status markers are inserted between data blocks stored on the log drive. A status marker contains, but is not limited to, a data block address, time of storage, and a single status bit that is initially set to zero. The purpose of status markers is to indicate whether or not data blocks that precede the status marker have been written to the disk array. For example, a status marker with its status bit set to zero indicates that the data blocks preceding have not yet been written to the disk array. If data blocks preceding a status marker have been written to a disk array, the status bit of that status marker is set to 1. In an alternative embodiment, the time stamp is relied upon rather than a separate status marker, saving the overhead required for updating status markers on write-back. Actually such a status bit may be initially set to one or zero when a block is written to the log drive, then the status bit is updated to the opposite of first set when the associated block is written to the disk array from the cache.

The log drive thus preserves a copy of all cache-resident data at all times, and that data will be available in the event of a primary power failure. Since status markers indicate which data blocks have not been written to the disk array, lost data can quickly be recovered when primary power returns. In the alternative embodiment described above, wherein the time stamp is relied upon, one would find the oldest time shown, then repeat all write operations. It will be apparent to one with skill in the art that there are many possible variations in the implementation of status markers to identify data stored on a log drive that has not been written to a disk array.

Figure 3:
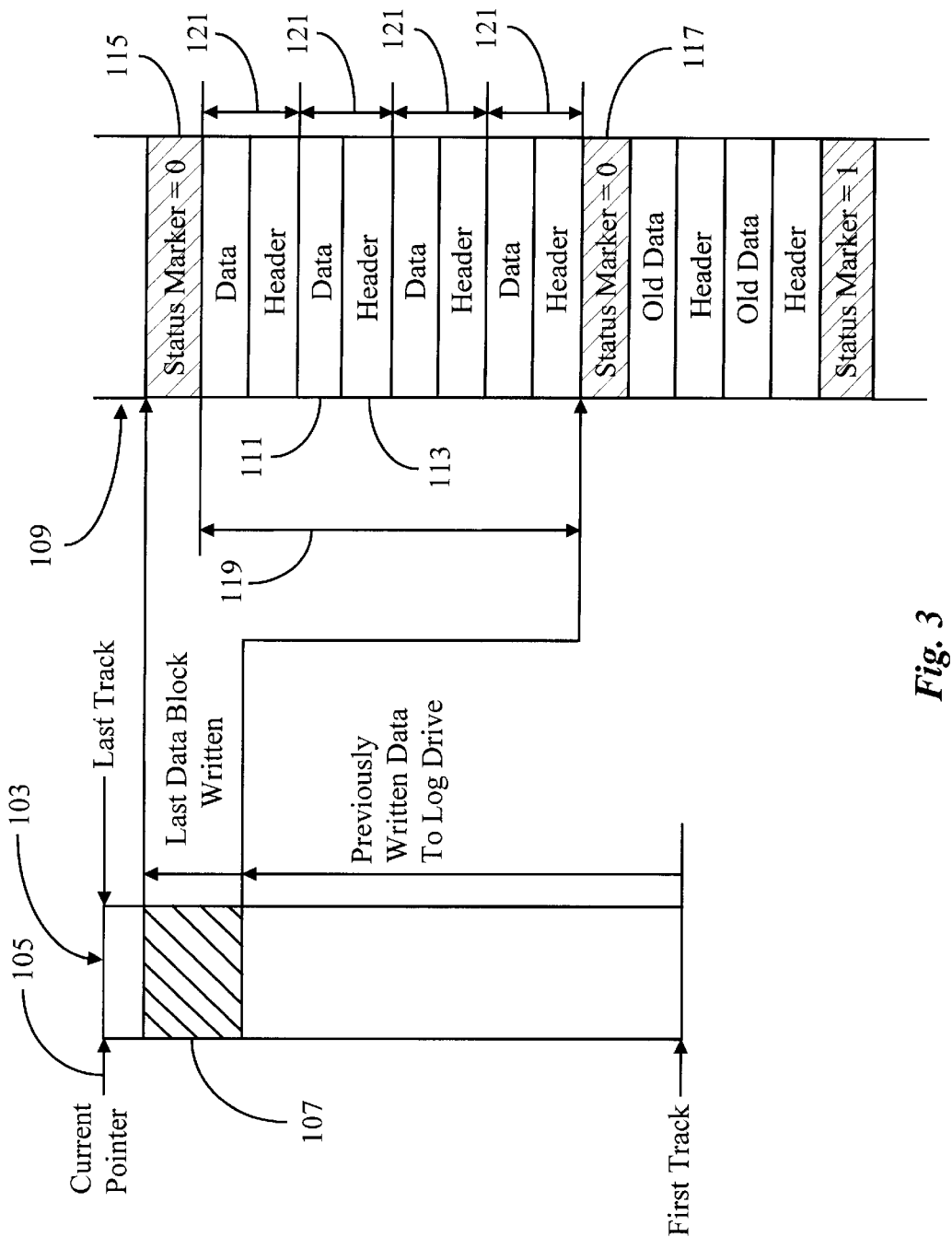
FIG. 3 is a diagram illustrating how data, sector headers, and status markers, written on a log drive, are organized according to an embodiment of the present invention.

FIG. 3 illustrates how data, sector headers, and status markers, written on log drive 57, are organized according to an embodiment of the present invention. In FIG. 3 element 103 represents the entire storage space of log drive 57. Element 107 represents the most recent data block written to the log drive. Data blocks arriving at network interface 63 (FIG. 2) are sequentially written to both the log drive and to cache 61. A pointer 105 indicates an address were the next data block will begin to be written.

Element 109, which is an expanded view of item 107, illustrates how data, sector headers, and status markers may be organized on log drive 57. It will be apparent to one with skill in the art that there are many possible variation in the structure of headers, data and status markers.

Referring to element 109, status marker 115 together with status marker 117 delimit a data block 119. The status bit of status marker 115 is set to zero, which indicates that preceding data block 119 has not been written to a disk array.

As is well-known in the art, a data block stored on a disk is organized into a set of sectors 121. Each sector contains a data field 111 and a header 113. The header includes, but is not limited to, the time, the date, and the cache address of the data block. A status marker may occupy a whole sector, or it may share a sector with data, in which case the sector contains more than the standard 512 bytes. The status bit of a status marker following a data block is initially set to zero. At a later time, when that data block has been written to a disk array, the status bit of a status marker is set to 1. Headers may also be combined with status markers.

Description of Operation

Figure 4:
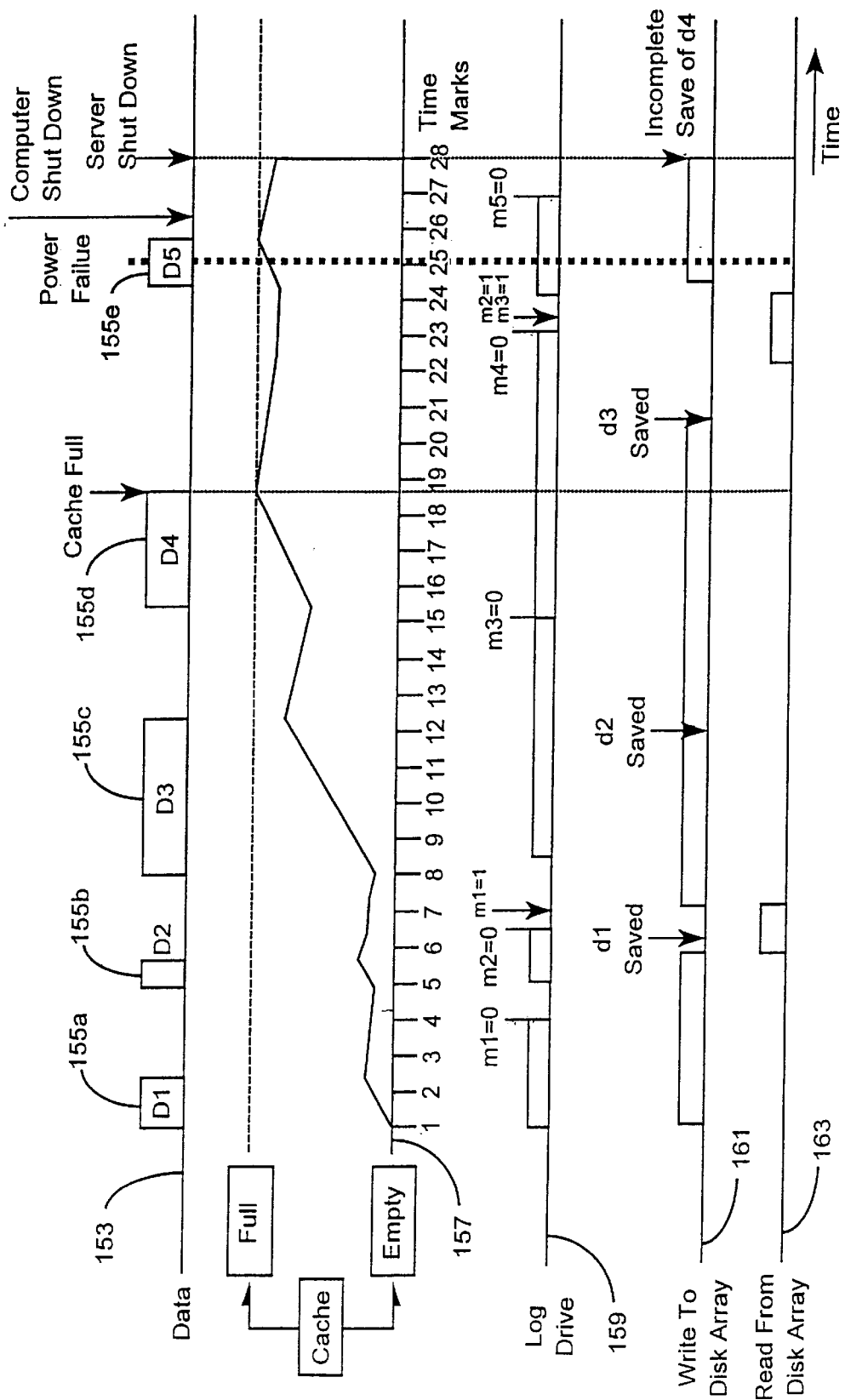
FIG. 4 is a diagram illustrating a time relationship between data transfer activities involving a cache and a log drive that operate in synchronous mode, and a disk array, according to an embodiment of the present invention.

FIG. 4 is a diagram illustrating time relationship between data transfer activities involving cache 61 and log drive 57 operating synchronously, and a disk array according to an embodiment of the present invention. Line 153 is a time axis showing a set of data blocks 155a, 155b, 155c, 155d, 155e of various lengths, placed as a function of time. Line 157 and associated features is a graphical representation of data contents of cache 61, ranging from empty to full, as a function of time, and according to receipt of the data blocks shown on line 153.

In this example, cache 61 is initially empty. For the purpose of having a time reference for the activities of all elements of FIG. 4, sequentially numbered time steps are drawn along the axis of line 157.

Line 159 represents write operations of log drive 57 as a function of time. Line 161 and line 163 represent respectively write and read operations of disk array 71 as a function of time.

Referring to line 157 and starting at time step 1, data block 155a enters the network interface of a server and is simultaneously written to cache 61, a log drive 57, and disk array 71. At time step 2, cache 61 completes its write cycle followed, at time step 4, by log drive 57. As shown along line 161, at time step 6 the disk array also completes its write cycle. At time step 4, a status marker is placed on the log drive. Since the preceding data has not completely been written to a disk array the status bit of the status marker is set to zero. It will be apparent to those with skill in the art that the rules for placing a status mark depends on criteria chosen by the designer and may vary for different server systems.

After time step 1, the contents of the cache increase as a function of time because data block 155a is being written into the cache. At time step 2, the write cycle to the cache is complete, but the disk array continues writing, thereby flushing data blocks out of the cache. As a result, the contents of the cache decrease as a function of time as illustrated in diagram 157.

Continuing with description of the operation, data block 155b arrives at network interface 63 at time step 5 when the cache and the log drive are ready to accept data. The disk array, as shown on line 161, is not available for storage until time step 7 because it must first execute a read cycle as shown along line 163. When, halfway between time steps 6 and 7, the write cycle of the log drive is completed, another status marker is placed on the log drive and its status bit is set to zero. Since no data is entering a network interface until time step 8 and data block 155a has been written to a disk array, log-drive controller 69 directs the log drive to search for a status marker that is associated with data block 155a and set its status bit to 1. It will be apparent to one with skill in the art that the rules for updating a status bit depends on criteria chosen by the designer and may vary for different server systems.

Continuing with the description of operation, at time step 12, data block 155b has been written to the disk array. However, the log drive is writing data block 155c and is not available to set the status bit associated with data block 155b to 1. At time step 23, data block 155c is written to the disk array and the log drive is available to set status bits associated with data blocks 155b and 155c to 1.

In this example, a primary power failure occurs at time step 25, while a data block 155e is being written to the cache, the log drive, and the disk array. In the event of primary-power failure, a message is posted to users via a connected video monitor warning about an imminent computer shutdown. Typically, 30 seconds or less is available to close and save files.

At time step 26, the computer shuts down. The disk array, however, requires more time to save the last data blocks and, consequently, the written data is incomplete as shown on line 161 at time step 28. However, in a server system enhanced with synchronous write according to the present invention, no data is lost because data block 155e is written to the log drive between time steps 24 and 27, well before the server system shuts down. When the primary-power recovers, a user may, by means of an interactive menu, direct log drive controller 69 to search for status markers with status bits that remained zero, and then direct the log drive controller to transfer to the disk array the data blocks that precede these status markers. In an alternative embodiment, control routines at startup after a power failure automatically search the log drive, and write any data on the log drive not yet written to the disk array to the disk array.

It will be apparent to those with skill in the art that there are many alterations in detail that might be made in the embodiments of the invention described herein without departing from the spirit and scope of the invention. There are, for example, variations in the way hardware may be connected to provide a log drive and synchronous write procedure as disclosed herein. There are similarly many different ways necessary control routines may be provided. An essential element is a non-volatile log memory apparatus to which blocks may be written synchronously with cache writes, and control routines to cause blocks to be identified on the log memory apparatus as to whether the blocks have been written to the associated disk array.

What is claimed is:

1. A data storage server system comprising:
    an interface to a network communication link;
    a CPU connected to the interface;
    a cache memory coupled to the CPU;
    an array of non-volatile storage drives coupled to the cache memory;
    a non-volatile log drive having a capacity equal to or larger than the cache memory capacity; and
    a log drive controller which couples the non-volatile log drive to the CPU, the log drive controller adapted to control the log drive as a circular buffer wherein the log drive controller writes a third copy of each received data block to the non-volatile log drive sector-sequentially from the first to the last sector until the log drive is filled, then returns to the first sector and overwrites in the same order;
    wherein the CPU writes a first copy of each received data block to the cache memory and writes a second copy from each first copy to the array of non-volatile storage drives following a write-back protocol; and
    wherein the log drive controller flags the third copy of each received data block in the non-volatile log drive with a status bit when the third copy is written to the non-volatile log drive.

2. A data storage server system as in claim 1 wherein the array of non-volatile storage drives comprises hard disk drives.

3. A data storage server system as in claim 1 wherein the array of non-volatile storage drives comprises writable magneto-optical disk drives.

4. A data storage server system as in claim 1 wherein the log drive controller flags the third copy of each received data block with a first status bit when the third copy is written to the non-volatile log drive, and reverses the first status bit to a second status bit when the second copy of the received data block resident in the cache memory is written to the array of non-volatile storage drives.

5. A data storage server system as in claim 1 wherein, upon return of power after power failure, the log drive controller searches for and identifies all third copies of received data blocks flagged with a first status bit in the non-volatile log drive, and copies the data blocks to the array of non-volatile storage drives.

6. A method for writing copies of blocks of data received to an array of non-volatile storage drives in a data storage server system utilizing a CPU, a cache memory, a non-volatile log drive at least equal in capacity to the cache memory and adapted to function as a circular buffer, comprising steps of:
    (a) providing a log drive controller for connecting the non-volatile log drive to the CPU, the log drive controller adapted to control the log drive as a circular buffer wherein the log drive controller writes a third copy of each received data block to the non-volatile log drive sector—sequentially from the first to the last sector until the log drive is filled, then returns to the first sector and overwrites in the same order;

(b) writing first copies of the blocks of data to the cache memory by the CPU and second copies of the blocks of data to the array of non-volatile storage drives by the CPU following a write-back protocol;

(c) writing third copies of the blocks of data to the non-volatile log drive, the log drive controller writing the third copy of each received data block to the non-volatile log drive sector-sequentially from the first sector in the first track to the last sector in the last track until the non-volatile log drive is filled, then returning to the first sector in the first track and overwriting the data in the order first written; and (d) flagging, with a status bit, the third copies of the blocks of data written to the non-volatile log drive.

7. The method of claim 6 wherein the flagging step comprises setting the status bit to a first status bit when the third copy of a block of data is written to the non-volatile log drive, and reversing the first status bit to a second status bit when the second copy of the block of data resident in the cache memory is written to the array of non-volatile storage drives.

8. The method of claim 6 further comprising the steps of identifying all third copies of data blocks flagged with a first status bit in the non-volatile log drive, and writing the third copies of the identified data blocks to the array of non-volatile storage drives.

\* \* \* \* \*